Oct. 22, 1929. J. L. CREVELING 1,732,929
ELECTRIC REGULATION
Original Filed May 21, 1924
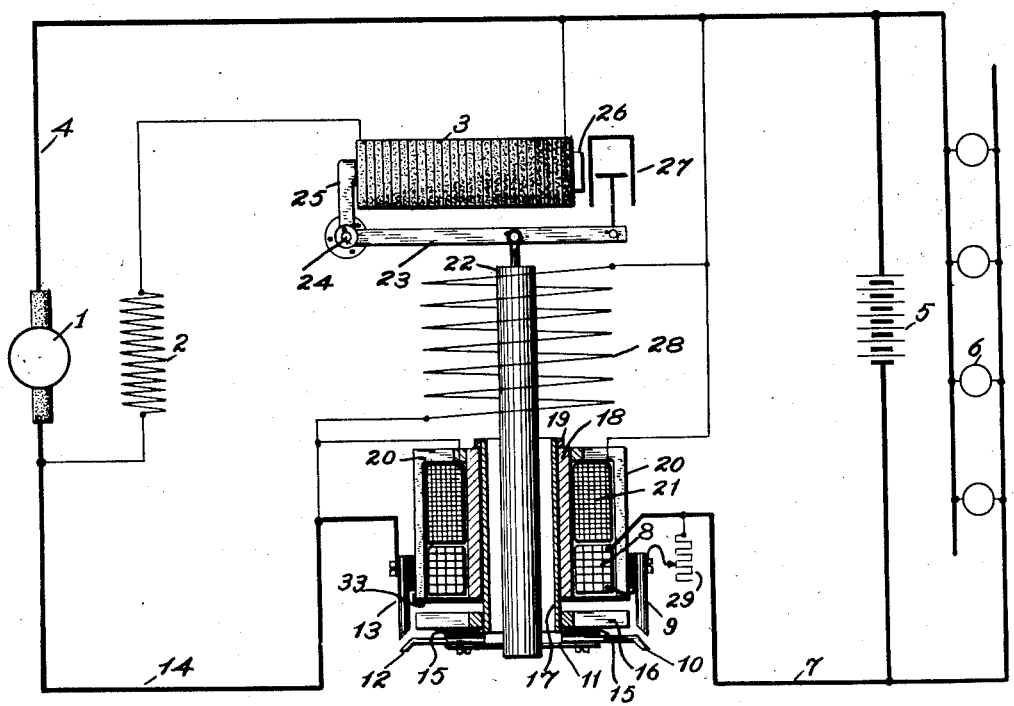
Fig. I.
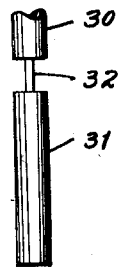
Fig. II.
INVENTOR.

Patented Oct. 22, 1929

1,732,929

UNITED STATES PATENT OFFICE

JOHN L. CREVELING, OF ORACLE, ARIZONA, ASSIGNOR, BY MESNE ASSIGNMENTS, TO SIMPLEX EQUIPMENT COMPANY, INC., OF NEW YORK, N. Y., A CORPORATION OF DELAWARE

ELECTRIC REGULATION

Application filed May 21, 1924, Serial No. 714,816. Renewed March 12, 1929.

My invention pertains to that class of electric regulation wherein a controllable source of electrical potential difference is automatically regulated in a predetermined manner and is capable of controlling the same to charge a storage battery and operate lamps or other translating devices in conjunction therewith which are maintained by the battery when the source is ineffective.

My invention has for its particular object to provide a simple, rugged, and effective means which will automatically regulate a controllable source of electrical potential difference within narrow limits and also cause the same to be connected with a circuit which it supplies under predetermined conditions and cause disconnection thereof from said circuit automatically under predetermined conditions, as may be desired in service.

As my invention is particularly applicable to systems wherein a variable speed dynamo or generator is used to operate lamps or other translating devices and supply a storage battery which maintains the same when the generator is running at sufficiently low speed or is at rest, such as the systems now in common use for the lighting of railway cars by a generator driven from the car-axle, it will be described with particular reference to such a system.

In the drawing, Fig. I diagrammatically represents one type of such system embodying the essentials of my invention; and Fig. II portrays a modification which may be made in the structure of Fig. I.

Referring to the drawing, 1 represents the commutator of a variable speed generator provided with the usual field coil 2 having in series therewith a regulating device or element, in this instance indicated as a carbon pile 3. It will therefore be plain that the electrical operation of the dynamo may be controlled by manipulation of the element or pile 3. The positive brush of the dynamo is connected with the lead 4 in electrical communication with the positive side of the storage battery 5 and the positive terminals of the lamps or other translating devices indicated at 6. The battery 5 and the translating devices 6 have their negative terminals connected, as indicated, with the wire 7 which is led to one end of the coil 8, having its opposite end connected with the flexible and insulated contact member 9 adapted to form an electrical connection with the contacting member 10 when the same is raised, as will hereinafter be explained. The contact member 10 is carried by an insulating support, as indicated at 15, and is connected with a similar contact member 12 by means of the conducting member 11. When the contact member 12 is raised it is adapted to form an electrical connection with the flexible insulated contacting member 13, connected as by the wire 14 with the negative brush of the generator. The contacts 10 and 12, together with their connecting member 11 and their insulating support 15, are carried by the armature 16, of iron or other magnetic material, mounted upon the hollow sleeve 17, of brass or other non-magnetic material, free to move within the sleeve or hollow core 18, of iron or other magnetic material, which may be supported in any suitable manner, not shown. The sleeve 17 has its motion in a downward direction limited as by the nut 19 and in an upward direction by the contact of the armature 16 with the thin washer, of brass or other non-magnetic material, indicated at 33, which may serve also to hold the coils 8 and 21 in place. The members 20 form yokes of magnetic material and make a close magnetic joint with the upper portion of the hollow core 18 and form therewith a magnetic circuit of the so-called "iron clad" type. The coil 21 is a voltage winding of fine wire connected across the generator circuit, as indicated. 22 is a core of iron or other magnetic material, in this instance indicated as pivotally connected with the lever 23 which is pivotally supported as at 24 and forms, with the short lever 25, a bell-crank lever for controlling the pressure upon the pile 3 which may be compressed between the short arm 25 and the abutting member 26. 27 is a dashpot which may be used, if desired, to prevent too sudden motion being imparted to the lever 23. 28 is a shunt or voltage coil of fine wire across the dynamo, as shown, and so arranged with respect to the core 22 that energization of the said coil 28 tends to lift the said core. 29 is an adjustable resistance in shunt across the coil 8 for the purpose of adjusting the current therein, as will hereinafter be explained.

In Fig. II there is shown a modification of the system of Fig. I, which consists in dividing the core 22 into independent parts 30 and 31 connected, as for example, by the non-magnetic member 32.

An operation of my invention is substantially as follows:

If the dynamo be at rest or running at sufficiently low speed, the various parts indicated in Fig. I will be in the positions occupied in the drawing and the generator main circuit will be open on account of the "breaks" between 9—10 and 12—13, while the lamps or translating devices 6 may be maintained by the battery 5 in an obvious manner. If, now, the generator have its speed increased until its voltage is very slightly in excess of that of the battery, I so adjust the coil 21 and its cooperating parts that it will, by setting up a magnetic flux through the hollow core 18 and yokes 20 and through the armature 16, cause the said armature to be raised and establish connection between 9—10 and 12—13, whereupon the generator will be connected with the battery and translating devices, from which the return current will flow through the coil 8, with the exception of that portion which may be shunted around the said coil by the resistance 29, for the purpose of adjustment. And I so wind the coil 8 that this current flowing therein will assist the coil 21 in setting up a flux through the members 18—20—16, and, therefore, the current in this coil will help to maintain the switch closed. Current will also flow through the voltage winding 28, and I so adjust and arrange this winding that if the generator voltage tend to exceed a predetermined limit the said winding 28 will raise the core 22 and, by decreasing the pressure upon the pile 3, cut down the field of the generator in such manner as to prevent this desired voltage maximum from being exceeded throughout speed changes of the dynamo. In practice, I usually choose to so adjust and arrange the coil 28 and its cooperating parts that it will prevent the generator voltage from appreciably exceeding that of the storage battery when the same is in a fully charged condition; and, therefore, when the voltage upon the battery rises as it approaches its fully charged state and thus aproaches the voltage held constant through the instrumentality of the coil 28, the current supplied to the battery will naturally taper off in a desired manner. I so arrange the magnetic circuit formed by the members 18—20—16 that, so long as the current circulating in the coil 8 is below a maximum which it is desired shall not be exceeded by the generator, the said coil and the coil 21 cooperating therewith set up a magnetic flux which is substantially confined to the said magnetic circuit 18—20—16, and, therefore, has little if any appreciable effect upon the core 22. These members are so arranged and so placed with regard to core 22 that if this maximum desired output be exceeded the magnetic circuit 18—20—16 will become saturated, and this excess current in the coil 8 will affect the core 22 so as to assist the coil 28 in raising the same, and therefore prevent this desired maximum current output from being appreciably exceeded throughout speed changes of the generator.

In Fig. I the coil 28 is shown above the coils 8 and 21 to indicate, in the conventional manner, that these coils cooperate magnetically to affect the core 22, while in practice the said coils may be placed in any desired relationship with respect to the core 22 that permits their magnetic cooperation as above specified and which is merely diagrammatically portrayed in the drawing.

In Fig. II there is shown a modification of the structure of Fig. I in that the core 22 is shown as divided into magnetically distinct members 30 and 31 which may be mechanically connected as by the non-magnetic member 32 so that the coil 28 may affect the member 30 while the coils 8 and 21 may affect the member 31 and thus mechanically assist the coil 28 in the manipulation of the pile 3, in a way that will be readily understood in view of the foregoing description of my invention with respect to Fig. I.

From the foregoing it will be noted that I have produced a simple and rugged type of switch and regulator wherein a switch operating mechanism cooperates with the voltage responsive regulating means at a time when this cooperation is desired, and then only, as the switch operating mechanism does not interfere appreciably with the voltage regulating device except at such times as the current tends to exceed a predetermined adjustable value.

Further, it will be noted that the cooperation between the current responsive means and the voltage responsive means is brought about at desired intervals only without the employment of separately movable parts for this purpose, which makes for a simple and permanently adjustable type of apparatus.

I do not wish in any way to limit myself to any of the exact types of structures shown in the accompanying drawing nor to any of the exact modes of operation given in the specification which are used merely to illustrate one employment of my invention, for it is obvious that considerable change in the structure of the apparatus shown and also in the operations outlined may be made without departing from the spirit and scope of my invention which is as set forth in the following claims.

I claim:

1. Electric regulating means and automatic means for operating the same at times unaided combined with circuit controlling means and operating means therefor capable of automatically opening and closing said circuit unaided and cooperating with the first-named operating means under predetermined regulating conditions only.

2. Electric regulating means and automatic means for independently operating the same combined with circuit controlling means and operating means therefor cooperating with the first-named operating means under predetermined conditions only.

3. Electric regulating means and automatic means for operating the same combined with circuit controlling means and operating means therefor comprehending a current responsive means normally substantially affecting only the controlling means and cooperating with the first-named operating means under predetermined regulating conditions only.

4. The combination with a source of voltage and separately operable means for controlling the same, of automatically operating means for the controlling means, a circuit supplied by said source including a controlling device, and responsive means affected upon fluctuations at said source for affecting said device adapted to operate the same unaided and to cooperate with the first-named operating means when affected by said fluctuations above a predetermined working value only.

5. The combination with a source of voltage and individually operable means for controlling the same, of operating means for said controlling means, a circuit supplied by said source including a controlling switch, and responsive means affected upon fluctuations at said source for affecting said switch adapted to operate the same unaided and to cooperate with the first-named operating means when affected by said fluctuations above a predetermined working value only.

6. The combination with a source of voltage and means for controlling the same, of voltage responsive operating means for the controlling means capable of thereby regulating the source unaided, a circuit supplied by said source including a controlling device and responsive means affected upon fluctuations at said source for affecting said device adapted to cooperate with the first-named operating means when affected by said fluctuations above a predetermined maximum working value only.

7. Electric regulating means and automatic means for independently operating the same combined with circuit controlling means and operating means therefor comprising a magnetic circuit and cooperating with the first-named operating means only when said circuit is substantially saturated.

8. The combination with a variable speed generator, a circuit supplied thereby and controlling means for said generator, of responsive means for operating said controlling means, a switch for controlling said circuit, responsive means for affecting said switch adapted to cooperate with the first-named responsive means under predetermined conditions, and a magnetic circuit the degree of saturation of which determines said conditions.

9. The combination with a variable speed generator, a circuit including a storage battery supplied thereby, a regulator for said generator, responsive means affected by generator voltage for controlling said regulator, a switch for controlling the connection between the generator and the battery, current responsive means affecting said switch and adapted, when the current therein tends to exceed a predetermined normal working value only, to cooperate with the said voltage responsive means to affect the operation of the generator.

JOHN L. CREVELING.